June 5, 1956
E. E. MEILSTRUP
2,748,489
VERNIER GAUGE FOR MEASURING TEMPLATES
USED ON POTENTIOMETER CARDS
Filed Nov. 8, 1952
2 Sheets-Sheet 1
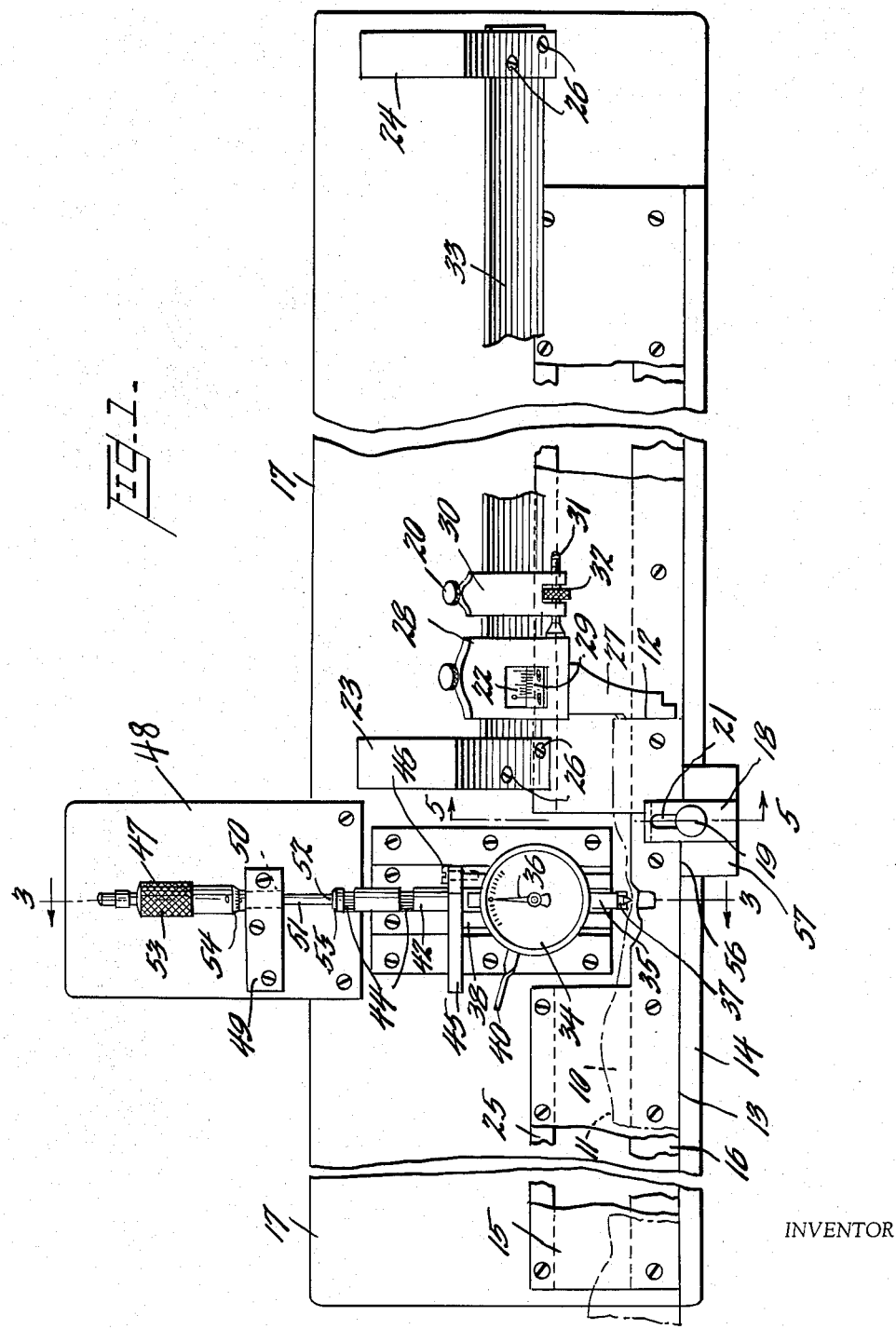
INVENTOR
*Emil E. Meilstrup*
BY *C. B. Hamilton.* ATTORNEY June 5, 1956
E. E. MEILSTRUP
2,748,489
VERNIER GAUGE FOR MEASURING TEMPLATES
USED ON POTENTIOMETER CARDS
Filed Nov. 8, 1952
2 Sheets-Sheet 2
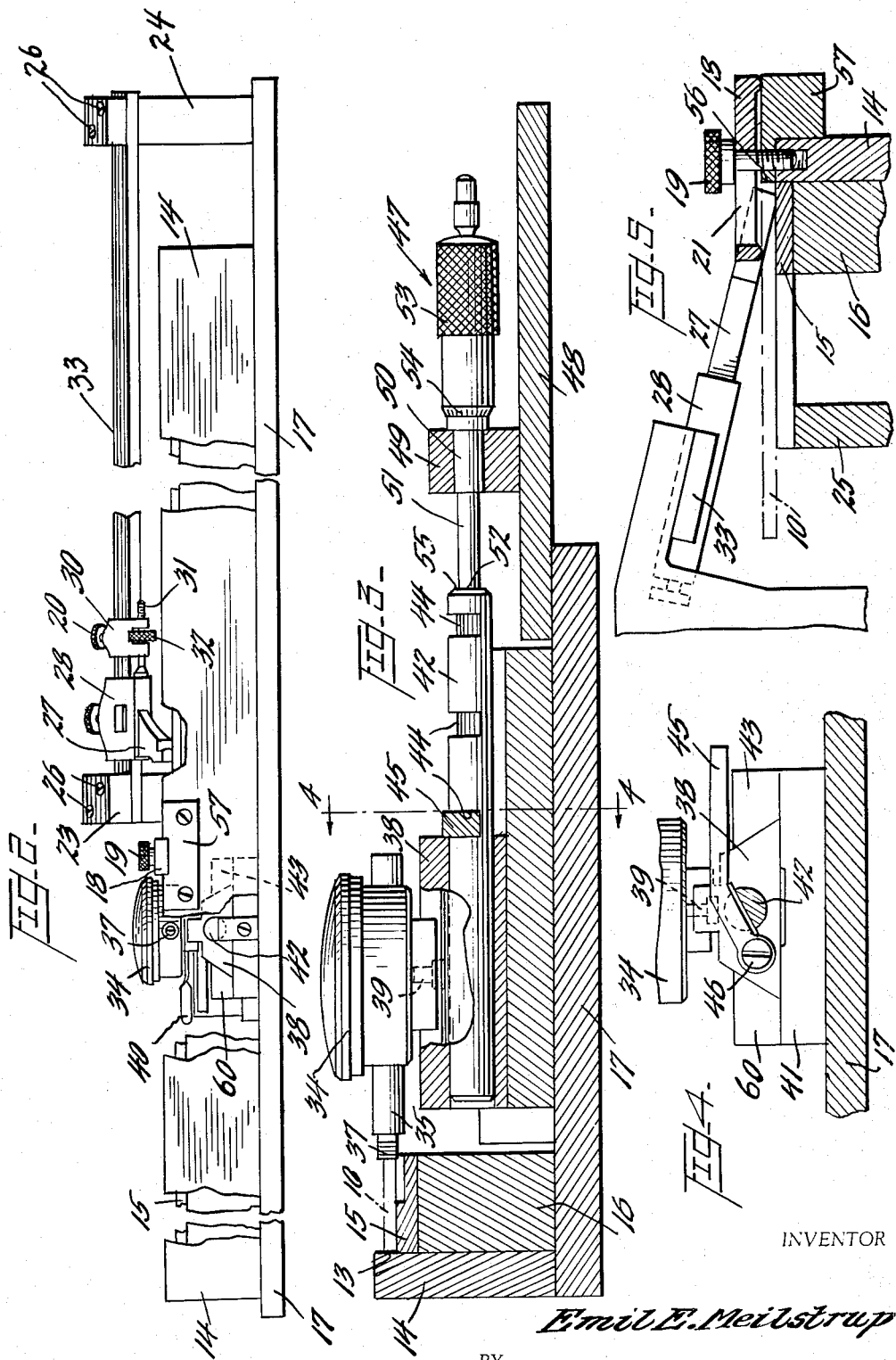
INVENTOR
*Emil E. Meilstrup*
BY *C. B. Hamilton*
ATTORNEY United States Patent Office 2,748,489
Patented June 5, 1956

2,748,489

VERNIER GAUGE FOR MEASURING TEMPLATES USED ON POTENTIOMETER CARDS

Emil Ernest Meilstrup, Winston-Salem, N. C., assignor to Western Electric Company, Incorporated, New York, N. Y., a corporation of New York Application November 8, 1952, Serial No. 319,502

7 Claims. (Cl. 33—174)

This invention relates to an article-gauging apparatus, and more particularly to means for gauging templates used for potentiometer cards.

In constructing resistance elements for use in potentiometers and rheostats that require the resistance value to change in accordance with a predetermined curve when a wiper contact is moved over turns of a resistance wire supported in a structure, this resistance wire is wound on a card-type support of irregular and precise contour. In some constructions, this wire-wound card-type resistance is then bent into a ring and mounted on a cylindrical body so that the wiper contact is rotated over the turns of the wire on an edge of the upright cylindrical card. With this construction it is possible to provide accurate, precision potentiometers. However, to obtain this accuracy these cards are formed by use of precision templates which must be ground with extreme accuracy to ultimately obtain the desired potentiometer. Heretofore, these templates have been cut out, then gauged, and corrected if not cut accurately. If too much material had been cut from the template, the template had to be discarded, but the process was generally ineffective and time-consuming.

It, therefore, is an object of the present invention to provide a new and improved apparatus for simultaneously gauging two crucial dimensions of a template used in the profiling of potentiometer cards.

Another object of the invention is to provide a new and improved apparatus to accurately determine and indicate pin-point locations on a contoured surface of a potentiometer card template.

With these and other objects in view, one embodiment of the invention consists of a base on which the template to be cut and gauged is clamped in a predetermined position, an adjustable, movable vernier gauge for accurately measuring predetermined stations or points longitudinally of the template, an indicator gauge having a plunger for engaging the template and movable in spaced distances into indentations in a gauge bar mounted in a slide which is locked through the gauge bar in positions, and a micrometer associated with the indicator gauge for engaging the end of the gauge bar in its particular positions to cooperate with the indicator gauge to measure the varying widths of the template at each of the stations along its contour.

Other objects and advantages will become apparent from the following detailed description when considered in conjunction with the accompanying drawings wherein:

Fig. 1 is a fragmentary plan view of an apparatus forming one embodiment of the invention for gauging a potentiometer card template;

Fig. 2 is a fragmentary front elevation of the apparatus;

Fig. 3 is an enlarged cross section taken along line 3—3 of Fig. 1 disclosing the structures for measuring the widths of the potentiometer card template;

Fig. 4 is a cross section taken along line 4—4 of Fig. 3, and

Fig. 5 is an enlarged partial cross section taken along line 5—5 of Fig. 1 disclosing the clamping mechanism for the template and the gauging leg of the vernier.

Referring now in detail to the drawings, wherein the same reference characters are employed to designate the same parts throughout the several views, a template 10 to be ground and gauged has an irregular side 11, a straight end 12, and straight side 13 which abuts an upright projecting portion of a plate 14. The template 10 rests on horizontal plate 15 which is secured to base 17 through intervening spacing blocks 16 and 25 and the template is held rigidly on plate 15 by means of clamping member 18. A thumbscrew 19 holds the clamping member 18 against the template 10 and a slot 21 in the clamping member permits it to be adjusted vertically. Block 57 fits into an indentation of plate 14 so that the portion 56 of the inner edge is in the same plane as the inner side of plate 14.

Slide bar 33 of a vernier caliper is provided with a scale 22 and is secured a predetermined distance above the base 17 by means of upright blocks 23 and 24 and machine screws 26. Mounted on this bar 33 is a slide 28, which is provided with a vernier scale 29 and depending gauging leg 27. Extending laterally from the slide 28 is a screw 31 to which is attached a sliding clamp 30 having a thumbnut 20 for locking the slide 28 to the bar 33.

Slidably mounted on the base 17 is a dial gauge 34 for accurately measuring the potentiometer card template 10 at predetermined points along its contour to determine size accuracy with respect to a standard. A pointer 36 in this gauge is actuated by the longitudinal movement of a plunger 37 which is axially movable in a cylinder 35 which extends from the housing of the dial gauge 34. A lever 40 moves the dial gauge 34 from and toward the template 10.

The rear of the dial gauge 34 is secured to a slide 38 by a screw 39. The slide 38 is movably mounted within a guideway provided by two spaced members 60 and 43 (Figs. 2 and 4), which are secured to block 41 on base 17, and slide 38 has a slidably snug working fit with a gauge bar 42 positioned therein. The gauge bar 42 has a series of spaced indentations 44 for receiving a locking lever 45 which is pivotally secured to the slide 38 by a screw 46.

A micrometer 47 is secured to a plate 48 which is rigidly attached to the base 17 by a clamping member 49 which retains a collar 50 in which a micrometer spindle 51 is freely movable. A gauging end 52 of the micrometer spindle 51 abuts an end 55 of the gauge bar 42. When the micrometer 47 is moved to zero position as indicated on micrometer scale 54 and the locking lever 45 is inserted in any one of the indentations 44, the tip of plunger 37 is a predetermined known distance from the inner upright edge of plate 14 (Fig. 3) against which the straight side 13 of template 10 abuts.

The use of the above-described apparatus in the actual forming of a potentiometer card template is as follows:

With the locking lever 45 in the first indentation 44 above the dial gauge 34 (as shown in Figs. 1 and 3), and with the micrometer 47 zeroed, the distance between the end of the tip of plunger 37 and the inner side of the plate 14 is one inch. Now, assuming that the distance between the indentations 44 is one inch, that the micrometer 47 can be taken up one inch, and that the dial gauge 34 can read one inch on its dial, then it is obvious that the apparatus can gauge any template that has a width (the distance between the irregular side 11 and the straight side 13 in a plane perpendicular to the straight side 13) from one to four inches.

The base 17 is divided into equidistant increments, for example, thirty, which may be called "stations." For the apparatus as shown in Fig. 1, with the vernier caliper scale 22 set at zero, the template 10 is said to be at the "zero" station. It has been predetermined what template width is necessary at each and every station from "zero" station to the last station "thirty."

In the forming of a particular potentiometer card template, assume that at "zero" station the width of the template 10 is to be 1¼ inches, then the locking lever 45 is placed in the first indentation 44 as shown in Fig. 1, and the micrometer spindle 51 is moved up ¼ inch into the head 53 and this ¼ inch is registered on micrometer dial 54. The back end 55 of the gauge bar 42 (Fig. 1) is then brought into contact with the gauging end 52 of the micrometer spindle 51. When the gauge bar 42 is so moved and positioned, the slide 38 and dial gauge 34 are also moved up the same distance because the lever 45 has locked the slide 38 to the gauge bar 42. Hence, the tip of the plunger 37 is exactly 1¼ inches from the inner edge of the plate 14.

When the template 10 is placed in position for gauging, the lifting lever 40 is depressed, thereby moving the plunger 37 out of the way so that the template 10 can be clamped to plate 15 by means of clamp 18 with the right end 12 of the template 10 against the gauging leg 27 of the vernier caliper.

The lifting lever 40 is then released and if the template 10 at this point on its contour has a width greater than 1¼ inches, the amount in excess will be indicated on the dial gauge 34 by the pointer 36. The template is then ground or cut so that its width at this particular station or location is precisely 1¼ inches, when the dial gauge 34 will read exactly zero.

To proceed to the next station or location along the contour of the template 10, the lifting lever is depressed to disengage the plunger tip 37 from the template and the thumbscrew 19 is loosened to release the clamp 18. Whereupon the clamp 30 of the vernier caliper is released and the thumbnut 32 is rotated to move the vernier caliper with its gauging leg 27 to the right (Fig. 1) a distance equal to the increment between stations. The gauging of the width at this station is then accomplished in the same manner as described above.

In the event the desired template width at this next station be between two and three inches, for example 2½ inches, the locking lever 45 is moved out of engagement with the indentation 44. Then the entire assembly consisting of dial gauge 34, slide 38, and locking lever 45 is moved up the gauge bar 42 to the second indentation from the dial gauge 34 and held in this position by the locking lever 45. The micrometer 47 is then set to indicate ½ inch and the template 10 can again be gauged in the manner described above and cut to a precise dimension. When the widths of the template 10 are found to be correct at all of the stations in accordance with predetermined data, then the template is of the desired contour and is ready for use in the profiling of potentiometer cards.

It is to be understood that the above-described arrangements are merely illustrative of the principles of the invention and that numerous other modifications may readily be devised by those skilled in the art which fall within the spirit and scope thereof.

What is claimed is:

1. An apparatus for gauging templates having an irregular side comprising a support, a vernier gauge secured to said support, said vernier gauge having a gauging leg for measuring predetermined distances from an end of the template, clamping means for securing the template in a predetermined position on the support adjacent to the gauging leg, a micrometer having a gauging end secured to the support, a slide movably mounted on the support, a gauge bar abutting the gauging end of the micrometer and slidable within the slide, a locking lever pivotally mounted to the slide to secure the slide to the gauge bar, a dial gauge secured to the slide, and a plunger for actuating the dial gauge, said micrometer, slide, gauge bar, and locking lever to place the tip of the plunger a known distance from the support and said plunger abutting the irregular side of the template to measure and determine the locations of points on said irregular side at said predetermined distances from the end of the template.

2. An apparatus for gauging templates used for making potentiometer cards comprising a support, a plate mounted perpendicularly to an end of said support, means for clamping the template to the support with one side of the template abutting the plate, a vernier gauge mounted on the support to measure the distance from an end of the template to a predetermined point on the side of the template, means for measuring the width of the template at said predetermined point, said width-measuring means including a slide movably mounted to the support, a gauge bar longitudinally slidable within the slide, said gauge bar having indentations a predetermined distance apart, a locking lever pivotally mounted to the slide to lock the gauge bar to the slide when engaged with any one of the indentations, a plunger actuated dial gauge secured to the slide, and a micrometer clamped to the support with the gauging end of its spindle abutting the end of the gauge bar so that the actuating end of the plunger on the dial gauge is a known distance from the plate secured to the end of the support in measuring the widths of the template at said predetermined points.

3. An apparatus for gauging potentiometer card templetes comprising a base, a slide bar, means for supporting the slide bar a predetermined distance above the base, an adjustable clamping member pivoted on the base for holding the potentiometer card template in predetermined positions thereon, means for moving the clamping member into engagement with the template positioned on the base, a vernier caliper movably mounted on the slide bar, means for adjustably positioning the vernier caliper, said vernier caliper having an extending leg for engaging an end of the template, an upright plate projecting above the base for guiding and positioning the template longitudinally of the base as the template is moved to predetermined positions, spaced guides fixedly mounted crosswise of the base for providing a guideway, a slide movably mounted in said guideway, a gauge bar having spaced indentations and slidably mounted in the said slide to desired gauging positions, a dial gauge secured to the slide, a plunger for engaging the positioned template and for actuating the dial gauge, a locking lever pivotally mounted to the slide for engaging one of the indentations in the gauge bar depending on the desired positioning of the gauge bar as determined by a particular width of the template to be measured, a micrometer, and means for mounting the micrometer to the base so that the outer end of its gauging spindle engages the rear end of the gauge bar when the micrometer is adjusted to accurately determine the widths of the template at various points as the template is clamped in predetermined positions longitudinally of the base.

4. An article measuring apparatus comprising a support, a micrometer secured to said support, said micrometer having a gauging end, a slide movably mounted on said support, a dial gauge secured to said slide, a plunger to actuate said dial gauge, a locking lever pivotally mounted on said slide, a gauge bar slidable within said slide, said gauge bar having spaced indentations adapted to receive said locking lever to provide an interlocked unit comprising said slide, dial gauge, locking lever and gauge bar, and one end of said gauge bar adapted to abut said micrometer gauging end, said micrometer and said unit adapted to place the tip of said plunger a predetermined distance from said support to measure one dimension of said article.

5. An apparatus adapted to gauge an article comprising a support, a slide movably mounted on said support, a dial gauge secured to said slide, said dial gauge having an indicator therein and a plunger to actuate said indicator, a guage bar slidable within said slide and having spaced indentations known distances apart thereon, a lever pivotally mounted on said slide and adapted to enter the gauge bar indentations to locate said gauge bar to said slide, a micrometer secured to said support, said micrometer having a gauging end adapted to abut an end of said gauge bar to place the tip of said dial gauge plunger at a known point with respect to said support.

6. An apparatus for gauging potentiometer card templates comprising a support to which the template is secured, a micrometer secured to the support, said micrometer having a gauging end, a slide movably mounted on the support, a dial gauge secured to the slide, a plunger to actuate the dial gauge, a gauge bar slidably mounted within the slide, one end of said gauge bar adapted to abut the micrometer gauging end, a locking lever pivotally mounted to the slide to lock the gauge bar to the slide to provide an interlocked unit of the gauge bar, the slide, the dial gauge, and the locking lever, said unit to cooperate with the micrometer to place the top of the plunger a predetermined distance from the support to gauge the widths of the template, and a vernier gauge mounted on the support and having a gauging leg, said vernier gauge being adapted to measure the distances from an end of the template where said widths are measured.

7. A template gauging apparatus which comprises a support, a plate secured to an end of the support, a clamp on the support for securing the template thereto, a vernier gauge mounted on the support to measure predetermined distances along the length of the template to given points thereon, a slide movably mounted on the support and crosswise to the length of the template, a dial gauge secured to the slide and having a plunger by which the dial gauge is actuated, a gauge bar longitudinally slidable within the slide, said gauge bar having a plurality of indentations at predetermined distances apart, a locking lever pivotally secured to the slide, said locking lever to engage any one of the indentations of the gauge bar so that the gauge bar, the slide, the dial gauge, and the locking lever will be secured together as a cooperative measuring unit, and a micrometer having a gauging end secured to the support, said gauging end abutting an end of the gauge bar so that the tip of said plunger of the dial gauge is a predetermined distance from the plate secured to the end of the support.

References Cited in the file of this patent

UNITED STATES PATENTS

| | | |
|---|---|---|
| 2,144,972 | Hirst | Jan. 24, 1939 |
| 2,207,625 | Lester | July 9, 1940 |
| 2,319,569 | White | May 18, 1943 |
| 2,325,170 | Bauer | July 27, 1943 |
| 2,468,325 | Eisele | Apr. 26, 1949 |
| 2,504,961 | Braaten | Apr. 25, 1950 |
| 2,538,311 | Hawks | Jan. 16, 1951 |
| 2,543,492 | Garay | Feb. 27, 1951 |